(12) United States Patent
Gilmer et al.

(10) Patent No.: US 11,492,936 B2
(45) Date of Patent: Nov. 8, 2022

(54) CRANKCASE VENTILATION SYSTEM WITH CONSTANT RESTRICTION IN THE FLOW DIRECTION AND FREE FLOW IN AN OPPOSITE DIRECTION

(71) Applicant: DAYCO IP HOLDINGS, LLC, Troy, MI (US)

(72) Inventors: Matthew C. Gilmer, South Lyon, MI (US); David E. Fletcher, Davison, MI (US); Chester E. Duffield, III, Warren, MI (US); David Snow, Redford, MI (US); Mitchell Emond, Shelby Township, MI (US); Joseph Dennis, Farmington Hills, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 98 days.

(21) Appl. No.: 16/739,831

(22) Filed: Jan. 10, 2020

(65) Prior Publication Data

US 2020/0224602 A1 Jul. 16, 2020

Related U.S. Application Data

(60) Provisional application No. 62/791,113, filed on Jan. 11, 2019.

(51) Int. Cl.
*F01M 13/00* (2006.01)
*F01M 13/02* (2006.01)
(Continued)

(52) U.S. Cl.
CPC ...... *F01M 13/023* (2013.01); *F01M 13/0011* (2013.01); *F02B 39/00* (2013.01);
(Continued)

(58) Field of Classification Search
CPC ............. F01M 13/023; F01M 13/0011; F01M 2013/0044; F01M 2013/0083;
(Continued)

(56) References Cited

U.S. PATENT DOCUMENTS

| 666,245 A | 1/1901 | Ginaca |
| 1,603,834 A | 10/1926 | Boynton |

(Continued)

FOREIGN PATENT DOCUMENTS

| CN | 208859006 U | 5/2019 |
| DE | 102004006632 A1 | 8/2005 |

(Continued)

OTHER PUBLICATIONS

PCT, International Search Report and Written Opinion, International Application No. PCT/US2020/013142 (dated Apr. 6, 2020) (8 pages).

(Continued)

*Primary Examiner* — Lindsay M Low
*Assistant Examiner* — Omar Morales
(74) *Attorney, Agent, or Firm* — FisherBroyles, LLP; Susan M. Oiler

(57) ABSTRACT

A breach detection system for an internal combustion engine having a crankcase, an intake manifold, a positive crankcase ventilation valve, a crankcase ventilation tube with a flow control system therein, and a pressure sensor between the flow control system and the crankcase. The flow control system subdivides the crankcase ventilation tube into a plurality of parallel conduits—a first conduit having a normally closed check valve that opens under a first preselected pressure drop in a first direction from the air intake to the crankcase, and a second conduit having either a second check valve that opens under a second preselected pressure drop in a second direction opposite the first direction or a (Continued)

restriction profile having a third preselected pressure drop that is the same in both the first and second direction. When the pressure sensor detects no pressure drop there is a breach in the system.

17 Claims, 13 Drawing Sheets

(51) Int. Cl.
| | |
|---|---|
| *F16K 15/06* | (2006.01) |
| *F16K 15/04* | (2006.01) |
| *F02B 39/00* | (2006.01) |
| *F02D 41/22* | (2006.01) |
| *F02M 25/06* | (2016.01) |
| *F02M 35/10* | (2006.01) |
| *F16K 17/12* | (2006.01) |
| *F16K 17/36* | (2006.01) |

(52) U.S. Cl.
CPC ............. *F02D 41/22* (2013.01); *F02M 25/06* (2013.01); *F02M 35/10222* (2013.01); *F16K 15/048* (2013.01); *F16K 15/066* (2013.01); *F16K 17/12* (2013.01); *F16K 17/36* (2013.01); *F01M 2013/0044* (2013.01); *F01M 2013/0083* (2013.01); *F01M 2250/60* (2013.01)

(58) Field of Classification Search
CPC ........................ F02M 25/06; F02M 35/10222; F16K 15/048; F16K 15/066; F16K 17/12; F02D 41/22
USPC .......................................................... 123/574
See application file for complete search history.

(56) References Cited

U.S. PATENT DOCUMENTS

| | | | |
|---|---|---|---|
| 1,802,720 A | 4/1931 | Junkers | |
| 2,447,729 A | 8/1948 | Bertea | |
| 3,468,337 A | 9/1969 | Smirl | |
| 4,215,717 A | 8/1980 | Frosch | |
| 5,193,577 A | 3/1993 | de Koning | |
| 6,457,760 B1 | 10/2002 | Pratt | |
| 6,698,719 B2 | 3/2004 | Geiser | |
| 6,779,388 B2 | 8/2004 | Baeuerle et al. | |
| 7,444,990 B1 | 11/2008 | Fisher et al. | |
| 7,588,047 B2 | 9/2009 | Vogt | |
| 7,726,335 B2 | 6/2010 | Doble | |
| 8,966,897 B2 | 3/2015 | Hahn | |
| 9,790,885 B2 | 10/2017 | Rollinger et al. | |
| 10,024,251 B2 | 7/2018 | Pursifull et al. | |
| 2001/0047801 A1* | 12/2001 | Baeuerle ................. F02M 25/06 123/574 |
| 2009/0320809 A1* | 12/2009 | Ruppel ................. F01M 13/022 123/563 |
| 2010/0147270 A1 | 6/2010 | Pursifull et al. | |
| 2011/0296836 A1* | 12/2011 | Hahn ..................... F02M 26/08 60/611 |
| 2014/0096754 A1 | 4/2014 | Monros | |
| 2016/0097354 A1 | 4/2016 | Martus et al. | |
| 2016/0290193 A1* | 10/2016 | Lemke ............... F01M 13/0011 |
| 2016/0326990 A1 | 11/2016 | Pursifull | |
| 2018/0119830 A1 | 5/2018 | Graham et al. | |
| 2018/0283572 A1 | 10/2018 | Bartow | |
| 2018/0334974 A1 | 11/2018 | Pursifull et al. | |

FOREIGN PATENT DOCUMENTS

| | | | |
|---|---|---|---|
| EP | 0531262 A2 * | 3/1993 | ............. F16K 15/06 |
| FR | 2663392 A1 | 12/1991 | |
| GB | 702875 A | 1/1954 | |
| KR | 20090007697 U | 7/2009 | |
| RU | 2378552 C2 | 1/2010 | |

OTHER PUBLICATIONS

International Search Report and Written Opinion, European Application No. 20738776.2 (dated Sep. 1, 2022) (10 pages).

Office Action and English translation, Chinese Application No. 2020800084320, dated Aug. 3, 2022 (14 pages).

\* cited by examiner

CRANKCASE VENTILATION SYSTEM WITH CONSTANT RESTRICTION IN THE FLOW DIRECTION AND FREE FLOW IN AN OPPOSITE DIRECTION

RELATED APPLICATIONS

This application claims the benefit of U.S. Provisional Application No. 62/791,113, filed Jan. 11, 2019, which is incorporated herein by reference in its entirety.

TECHNICAL FIELD

This application relates to a crankcase ventilation breach detection system having a constant restriction of flow in the normal flow direction and free flow in the opposite direction, more particularly, to such a system achieving the same with a tuned orifice and at least one check valve in a parallel configuration.

BACKGROUND

In automotive engines, on/off operation of a vacuum generator and/or accessory is frequently controlled by a gate valve in which a rigid gate is deployed across a conduit to stop the flow of a fluid (in this exemplary application, air) through the valve. Within automated or "commanded" valves, the gate is typically actuated by a solenoid and opened or closed in response to an electrical current applied to the solenoid coil. These solenoid-powered gate valves also tend to include a coil spring, diaphragm, or other biasing element which biases the gate towards an unpowered, 'normally open' or 'normally closed' position.

The pressure in an engine crankcase is ideally maintained near atmospheric pressure (ATM pressure+/−5 kPa). Furthermore, it is desirable to be able to detect any leak in the crankcase ventilation system (path from fresh air to the manifold, including all flow passageways and passageway connections) to ensure crankcase gasses are appropriately managed to avoid excessive pollutants being discharged into the atmosphere. In order to achieve these conditions, free flow (minimal restriction) of air into the crankcase is needed, which can be switched to a restricted opening, in order to conduct a pressure integrity check (and not create an excessively negative pressure in the crankcase). The gate valve approach while successful, is more expensive, heavier, and takes up engine space. A more cost effective and compact system to enable the pressure integrity check of the crankcase ventilation system is desirable, especially one as disclosed herein that does not require any electrical connections to move an actuator, such as a solenoid, to operate a valve.

SUMMARY

In all aspects, a breach detection system for an internal combustion engine having a crankcase, an intake manifold, a positive crankcase ventilation valve, a crankcase ventilation tube with a flow control system therein, and a pressure sensor between the flow control system and the crankcase is disclosed. The flow control system subdivides the crankcase ventilation tube into a plurality of parallel conduits—a first conduit having a normally closed check valve that opens under a first preselected pressure drop in a first direction from the air intake to the crankcase, and a second conduit having either a second check valve that opens under a second preselected pressure drop in a second direction opposite the first direction or a restriction profile having a third preselected pressure drop that is the same in both the first and second direction. When the pressure sensor detects no pressure drop there is a breach in the system.

In one embodiment, the flow control system comprises the restriction profile in the second conduit, and the internal combustion engine is a naturally aspirated engine, and the first preselected pressure drop is greater than the third preselected pressure drop.

In another embodiment, the internal combustion engine has a turbocharger and the crankcase ventilation tube connects upstream of the compressor of turbocharger. The flow control system comprises the second check valve in the second conduit, and the second preselected pressure drop is the same or lower than the first preselected pressure drop.

In yet another embodiment, the flow control system comprises the second check valve in the second conduit and further comprises a third conduit parallel to the first and second conduits, the third conduit has a restriction profile having a third preselected pressure drop that is the same in both the first direction and second direction of flow. Here, the first preselected pressure drop is greater than the third pressure drop, and the second pressure drop is the same or less than the third pressure drop.

In all aspects, the normally closed check valve defines an internal cavity in which an elastically flexible disk is seated and is held in the closed position against a first seat by a plurality of fingers extending into the internal cavity, wherein a pressure drop across the elastically flexible disk from the first seat to the plurality of fingers flexes the elastically flexible disk into an open position, or defines an internal cavity in which a hemispherical poppet sealing member is seated and is held in the closed position against an annular seat. The annular seat of the hemispherical poppet check valve, in a longitudinal cross-section through the check valve, defines a convex spherical radius and, in the closed position, a convex surface of the hemispherical poppet sealing member is sealing engaged with the convex spherical radius of the annular seat. In this variation, one or both of the annular seat and the hemispherical poppet sealing member include a ring of elastomeric sealing material to define the convex spherical radius of the annular seat or the portion of the convex surface of the hemispherical poppet sealing member that engages the annular seat in the closed position.

In all aspects, the second check valve defines an internal cavity in which a sealing disk floats and translates between an open position and a closed position based on pressure drops in the system. The second check valve is a normally neutral check valve.

In one embodiment, the breach detection system for an internal combustion engine has a crankcase, an intake manifold, a positive crankcase ventilation valve, a crankcase ventilation tube with a flow control system therein, and a pressure sensor between the flow control system and the crankcase. The crankcase ventilation tube having a first flow direction from the air intake to the crankcase and a second flow direction opposite thereof and subdividing into a flow control system. The flow control system subdivides the crankcase ventilation tube into a plurality of parallel conduits—a first conduit having a normally closed check valve that opens under a first preselected pressure differential in the first flow direction, and a second conduit having a second check valve that opens under a second preselected pressure differential in a second direction opposite the first direction, and a third conduit having a restriction orifice allowing flow in both the first and second flow direction at pressure differentials below the first preselected pressure differential.

When the pressure sensor detects no pressure drop there is a breach in the system. In all aspects of this embodiment, the first check valve is a normally neutral check valve.

In all aspects, the internal combustion engine has a turbocharger and the crankcase ventilation tube connects upstream of the compressor of turbocharger.

The normally closed check valve defines an internal cavity in which an elastically flexible disk is seated and is held in the closed position against a first seat by a plurality of fingers extending into the internal cavity, wherein a pressure drop across the elastically flexible disk from the first seat to the plurality of fingers flexes the elastically flexible disk into an open position, or in which a hemispherical poppet sealing member is seated and is held in the closed position against an annular seat. The annular seat, in a longitudinal cross-section through the check valve, defines a convex spherical radius and, in the closed position, a convex surface of the hemispherical poppet sealing member is sealing engaged with the convex spherical radius of the annular seat. In the first embodiment, the first valve defines an internal cavity in which a sealing disk floats and translates between an open position and a closed position based solely on pressure drops in the system. In the second embodiment, one or both of the annular seat and the hemispherical poppet sealing member include a ring of elastomeric sealing material to define the convex spherical radius of the annular seat or the portion of the convex surface of the hemispherical poppet sealing member that engages the annular seat in the closed position. In all embodiments, the second check valve is a normally neutral check valve and defines an internal cavity in which a sealing disk floats and translates between an open position and a closed position based on pressure drops in the system.

In all aspects, the third of the three parallel conduits has a symmetrical restrictor profile such that flow through the restrictor in the first and the second direction occurs under the same pressure differential, and the second preselected pressure differential is lower than the first preselected pressure differential.

DETAILED DESCRIPTION

Figure 1:
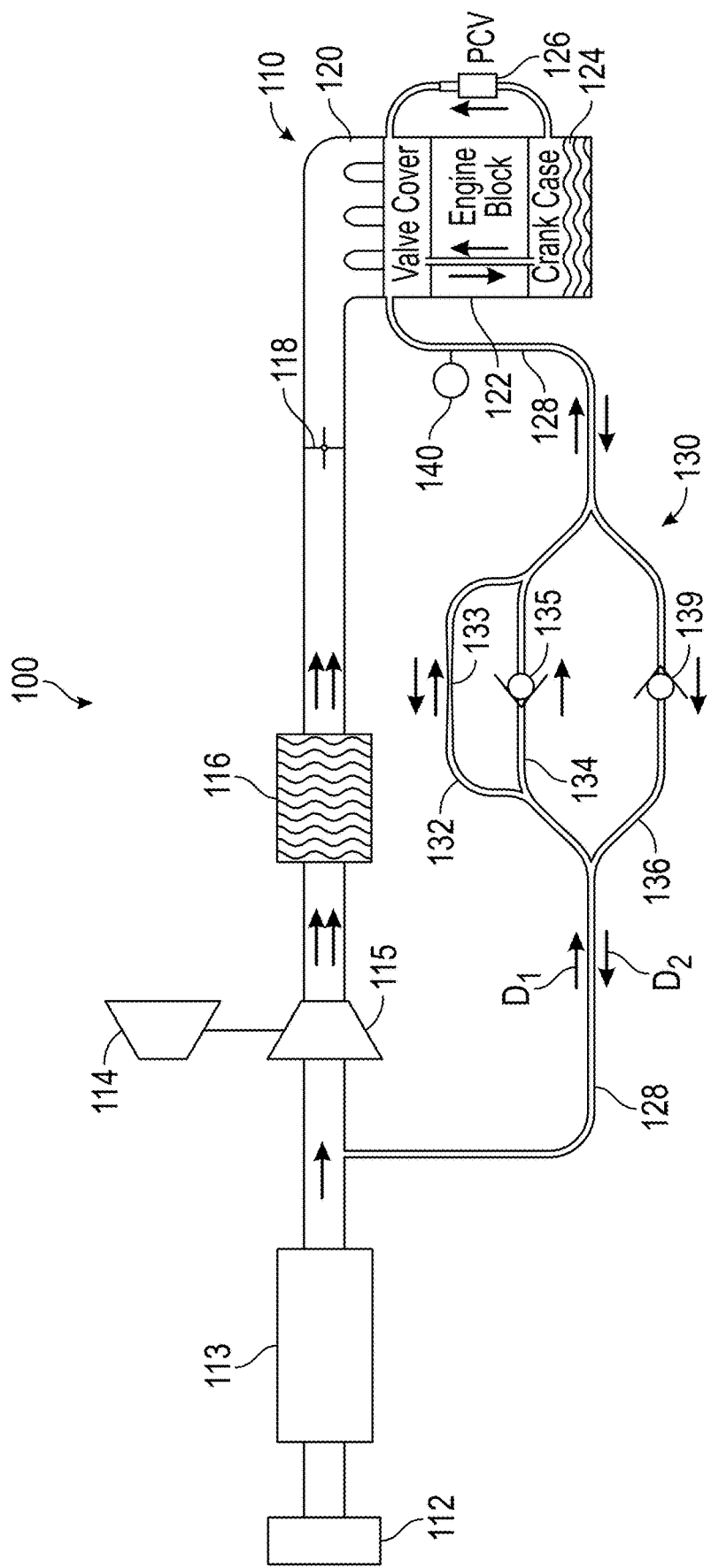
FIG. 1 is a schematic illustration of a turbocharged engine having a crankcase ventilation breach detection system defining a flow control system having three conduit pathways in parallel, one with a restrictor and the others each with a check valve controlling flow in opposing directions under preselected engine conditions.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

As used herein, a "normally closed" check valve is in the closed position until the pressure differential (change in pressure) between the inlet and the outlet is sufficient to overcome the spring holding the poppet in the closed position. A "normally neutral" check valve is neither open or closed and depends on sufficient pressure differential to overcome the minimal mass of the poppet to be in either the open or closed position, depending on the flow direction.

FIG. 1 illustrate one embodiment of an engine system 100, which may be a vehicle engine system that is a turbocharged or supercharged system. However, in other embodiments, such as FIG. 2, the engine system can be a naturally aspirated engine. The engine system 100 is configured for combusting fuel vapor accumulated in at least one component thereof and includes a multi-cylinder internal combustion engine 110. The engine system 100 receives air from an air intake 112, which may include an air filter 113 (also known as an air cleaner). The engine system of FIG. 1 is a turbocharged engine system, but could just as equally be a supercharged engine system, having a turbocharger 114. The compressor 115 of the turbocharger 114 receives air from the air intake 112, compresses the air, and directs a flow of compressed air (or boosted air) downstream through a charge air cooler or intercooler 116 and then to a throttle 118. The throttle 118 controls fluid communication between the compressor 115 and the intake manifold 120 of the engine 110. The throttle 118 is operable using known techniques to vary an amount of intake air provided to the intake manifold 120 and the cylinders of the engine. In alternative embodiments, the intercooler 116 may be positioned downstream of the throttle, and as such, may be housed in the intake manifold.

Intake manifold 120 is configured to supply intake air or an air-fuel mixture to a plurality of combustion chambers of engine 110 located within the engine block 122. The combustion chambers are typically arranged above a lubricant-filled crankcase 124 such that reciprocating pistons of the combustion chambers rotate a crankshaft (not shown) located in the crankcase 124. Unburned fuel and other combustion products may escape past each piston and/or valve guides from the engine block into the crankcase 124. The resulting gases in the crankcase, often referred to as "blow-by" gases may excessively pressurize the crankcase 124 if not vented therefrom. Engine 110 includes a crankcase ventilation (CV) system, which serves to vent blow-by gases from the crankcase 124 to intake manifold 120.

Still referring to FIG. 1, the CV system includes a positive crankcase ventilation valve 126 in fluid communication between the crankcase 124 and the intake manifold 120, to regulate the flow of blow-by gases from the crankcase to the intake manifold, and a conduit known as a crankcase ventilation tube 128 placing the crankcase 124, in particular, the blow-by gas in fluid communication with clean air from the air intake 112. Here, the crankcase ventilation tube 128 is in fluid communication upstream of the compressor 115. The crankcase ventilation tube 128 divides into a flow control system 130 that includes a pressure sensor 140 positioned between the flow control system 130 and the crankcase 124. In the flow control system detection of no pressure drop by the pressure sensor 140 indicates a breach in the system.

The flow control system 130 in the embodiment of FIG. 1 includes three parallel conduits, one conduit 132 defines a restriction profile 133, another conduit 134 has a normally closed check valve 135 controlling flow therethrough from the air intake to the crankcase, and yet another conduit 136 has a second check valve 139 controlling flow therethrough from the crankcase to the air intake. The normally closed check valve 135 opens under a first preselected pressure drop, the second check valve opens under a second preselected pressure drop, and the restriction profile has a third preselected pressure drop that is the same in either direction of flow therethrough. A first direction $D_1$ (the normal flow direction) is from the air intake upstream of the compressor to the crankcase and the second direction $D_2$ is the opposite of the first direction.

The flow control system of FIG. 1 is set to have the first preselected pressure drop of the normally closed check valve 135 greater than the third pressure drop of the restrictor 133, and the second pressure drop of the second check valve 139 is the same or less than the third pressure drop of the restrictor 133. The first, second and third pressure drops are in a range of about 1.5 kPa to about 4 kPa, and more preferably about 2.5 kPa to about 3.5 kPa. "About" herein means +/−0.5 kPa. In one embodiment, the third pressure drop is set at about 2.8 kPa.

Embodiments of a normally closed check valve 135 are described in detail below with reference to FIGS. 4-6 and 10-15. The second check valve 139 is described in detail below with reference to FIGS. 7 and 8.

Figure 9:
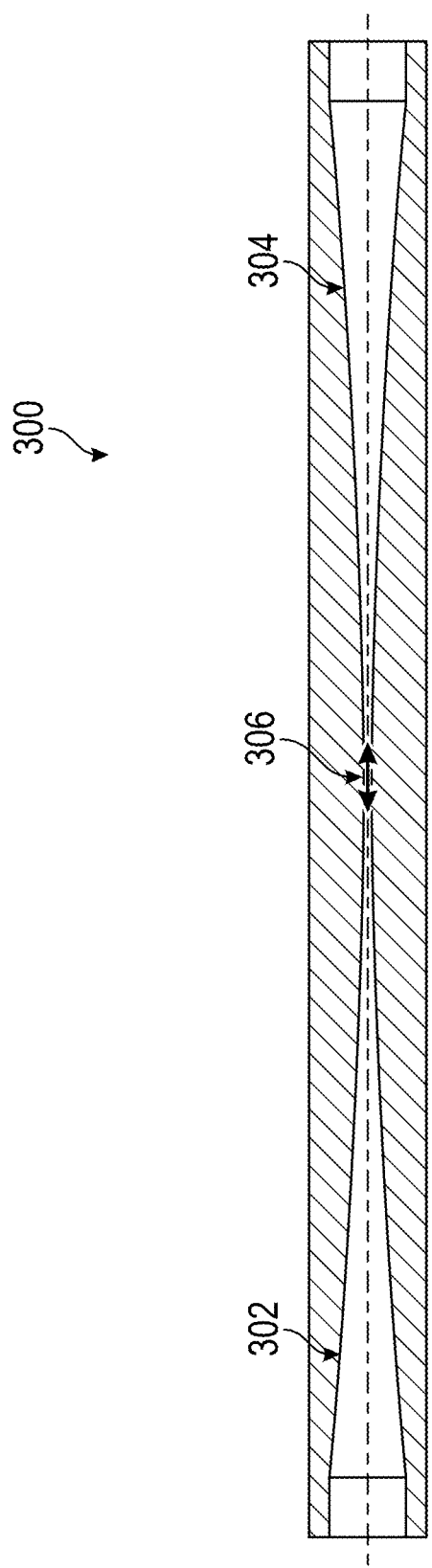
FIG. 9 is a longitudinal, cross-sectional view of a restrictor profile.
Figure 10:
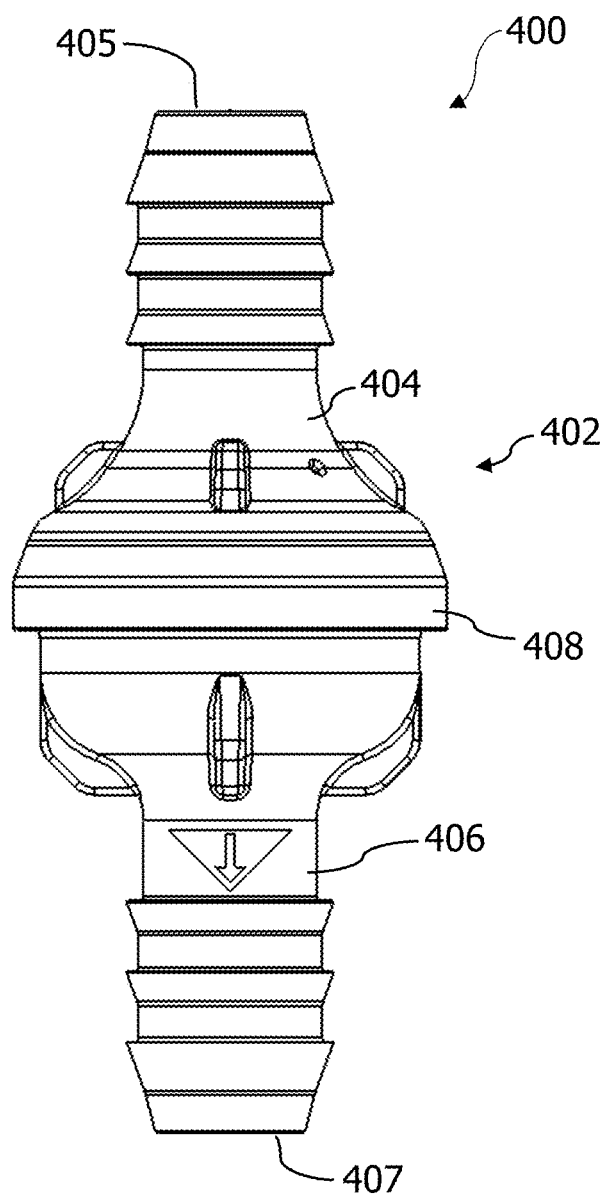
FIG. 10 is a front perspective view of a check valve.

Referring to FIG. 9, a restrictor profile 300 for the conduit pathway 132 is illustrated. The restrictor profile 300 has symmetrical, mirror image upstream and downstream portions 302, 304. Both portions 302, 304 are circular, when viewed in a transverse cross-section, and each narrow according to a parabolic or hyperbolic function along its length, which meet at the throat 306. The throat diameter is the parameter that determines or sets the maximum mass flow rate. A larger diameter for the throat equates to a larger mass flow rate. Here, the throat diameter is in a range of about 2 mm to 5 mm, more preferably about 2 mm to about 3 mm. For the throat diameter, "about" means +/−0.1 mm.

Figure 2:
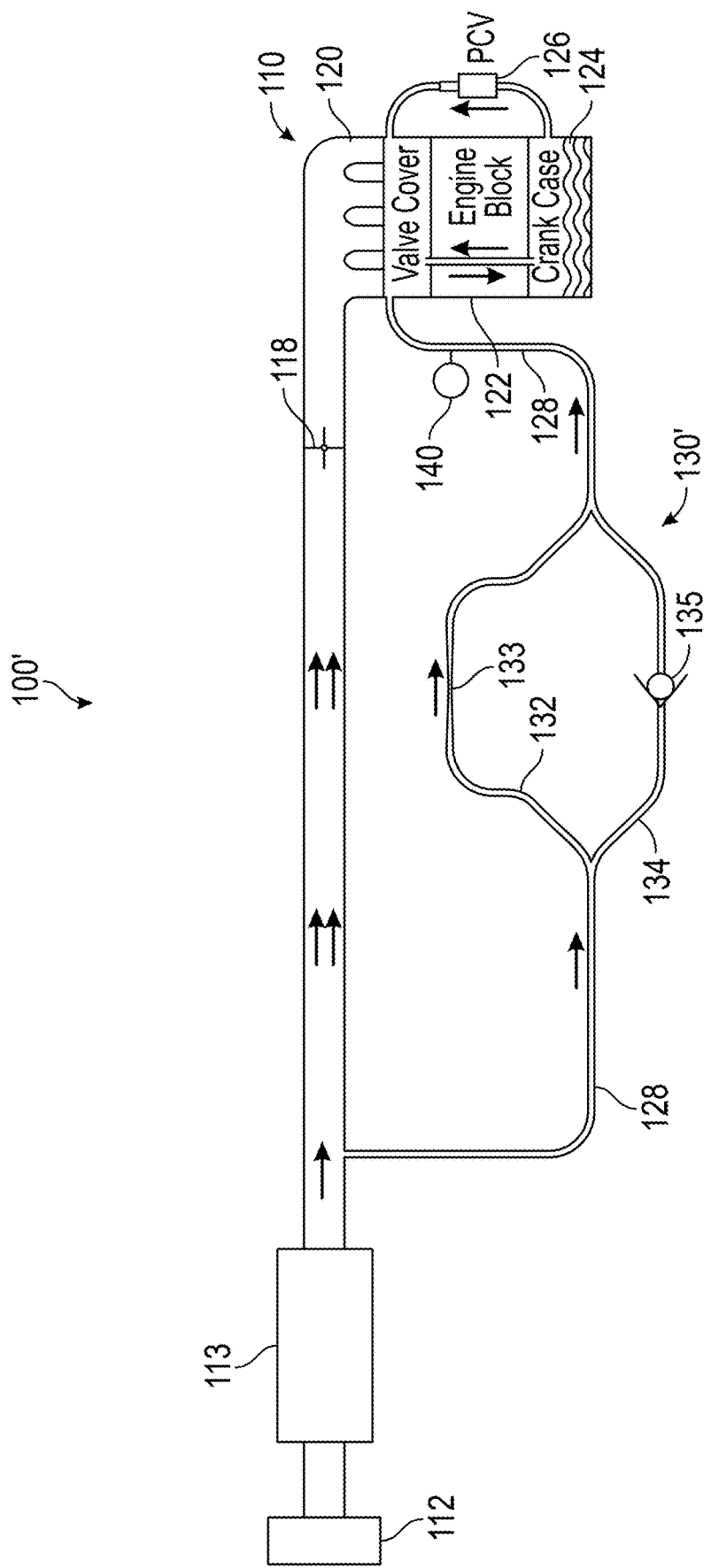
FIG. 2 is a schematic illustration of a naturally aspirated engine having a crankcase ventilation breach detection system defining a flow control system having two conduit pathways in parallel, one with a restrictor and the other with a check valve controlling fluid flow in a flow direction toward the crankcase.

Referring now to FIG. 2, a naturally aspirated engine system 100' is shown. The engine system 100' receives air from an air intake 112, which may include an air filter 113 (also known as an air cleaner), and directs the air to a throttle 118. The throttle 118 controls fluid communication between the air intake 112 and the intake manifold 120 of the engine 110. The throttle 118 is operable using known techniques to vary an amount of intake air provided to the intake manifold 120 and the cylinders of the engine. Intake manifold 120 is configured to supply intake air or an air-fuel mixture to a plurality of combustion chambers of engine 110 located within the engine block 122. The combustion chambers are typically arranged above a lubricant-filled crankcase 124 such that reciprocating pistons of the combustion chambers rotate a crankshaft (not shown) located in the crankcase 124. Unburned fuel and other combustion products may escape past each piston and/or valve guides from the engine block into the crankcase 124. The resulting gases in the crankcase, often referred to as "blow-by" gases may excessively pressurize the crankcase 124 if not vented therefrom. Engine 110 includes a crankcase ventilation (CV) system, which serves to vent blow-by gases from the crankcase 124 to intake manifold 120.

Still referring to FIG. 2, the CV system includes a positive crankcase ventilation valve 126 in fluid communication between the crankcase 124 and the intake manifold 120, to regulate the flow of blow-by gases from the crankcase to the intake manifold, and a conduit known as a crankcase ventilation tube 128 placing the crankcase 124, in particular, the blow-by gas in fluid communication with clean air from the air intake 112. Here, the crankcase ventilation tube 128 is in fluid communication upstream of the throttle 118. The crankcase ventilation tube 128 divides into a flow control system 130' that includes a pressure sensor 140 positioned between the flow control system 130' and the crankcase 124. In the flow control system detection of no pressure drop by the pressure sensor 140 indicates a breach in the system.

The flow control system 130' in the embodiment of FIG. 2 includes two parallel conduits, one conduit 132 defines a restriction profile 133, another conduit 134 has a normally closed check valve 135 controlling flow therethrough from the air intake to the crankcase. The normally closed check valve 135 opens under a preselected pressure drop and the restriction profile has a preselected pressure drop that is the same in either direction of flow therethrough. The flow control system of FIG. 2 is set to have the preselected pressure drop of the normally closed check valve 135 greater than the pressure drop of the restrictor 133. The pressure drops are in a range of about 1.5 kPa to about 4 kPa, more preferably about 2.5 kPa to about 3.5 kPa. "About" herein means +/−0.5 kPa. In one embodiment, the pressure drop selected for the restrictor 133 is about 2.8 kPa.

Figure 3:
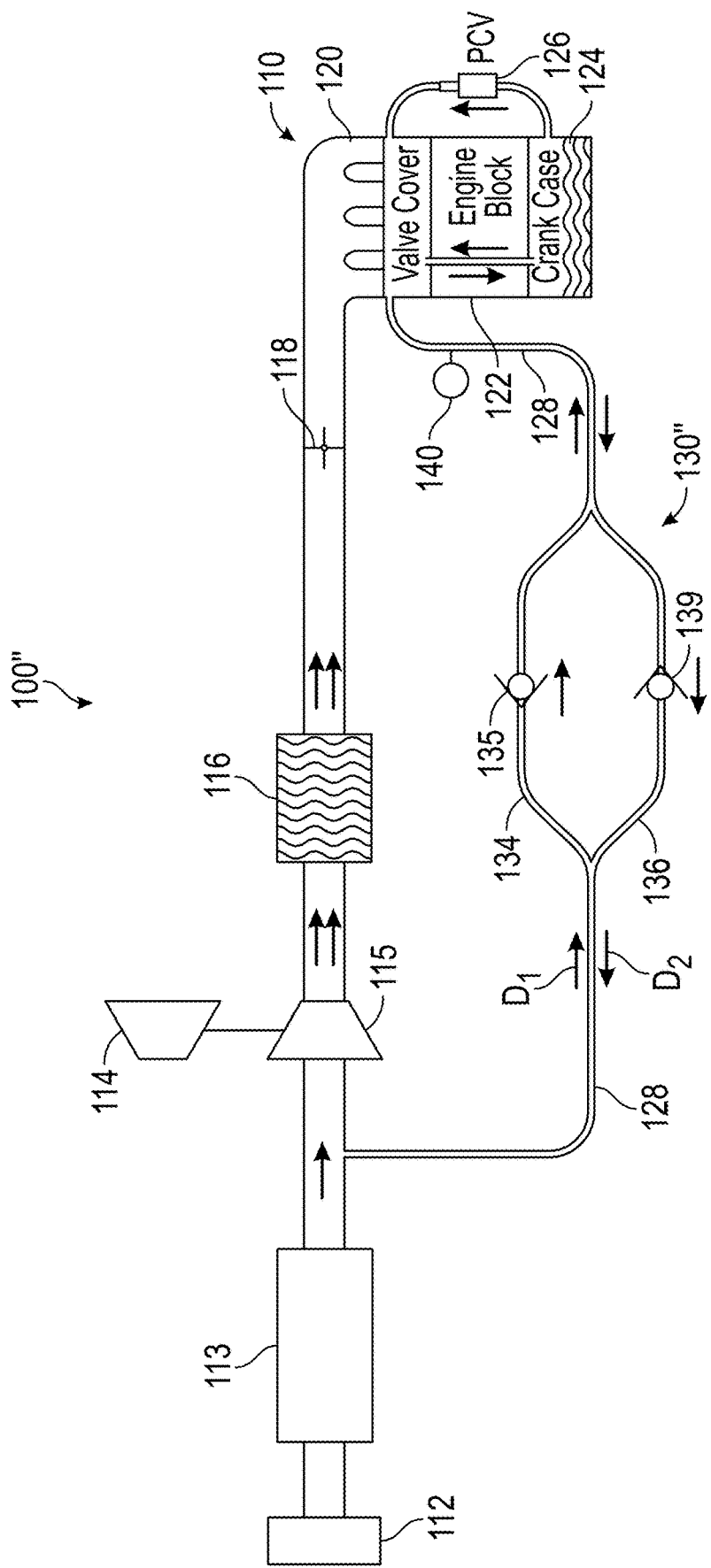
FIG. 3 is a schematic illustration of a crankcase ventilation breach detection system of a turbocharged engine having a flow control system having parallel conduit pathways each with a check valve controlling flow in opposing directions under preselected engine conditions.

Referring now to FIG. 3, an engine system 100" is shown that is similar to the engine system 100 of FIG. 1 except that the flow control system, here referred to as flow system 130", has two parallel check valves controlling flow in opposite directions without the presence of the conduit pathway having the restrictor. Here, one conduit 134 has a normally closed check valve 135 controlling flow therethrough from the air intake to the crankcase, and another conduit 136 has a second check valve 139 controlling flow therethrough from the crankcase to the air intake. The normally closed check valve 135 opens under a first preselected pressure drop to control flow in the first direction $D_1$ (the normal flow direction), and the second check valve opens under a second preselected pressure drop to control flow in the second direction $D_2$, which is opposite of the first direction.

The flow control system 130" of FIG. 3 is set to have the second pressure drop of the second check valve 139 equal to or less than the first pressure drop of the normally closed check valve 135. The first and second pressure drops are in a range of about 0.5 kPa to about 7 kPa, more preferably about 1.5 kPa to about 4 kPa, more preferably about 2.5 kPa to about 3.5 kPa. "About" herein means +/−0.5 kPa. In one embodiment, the first pressure drop is set at about 3.5 kPa.

Figure 4:
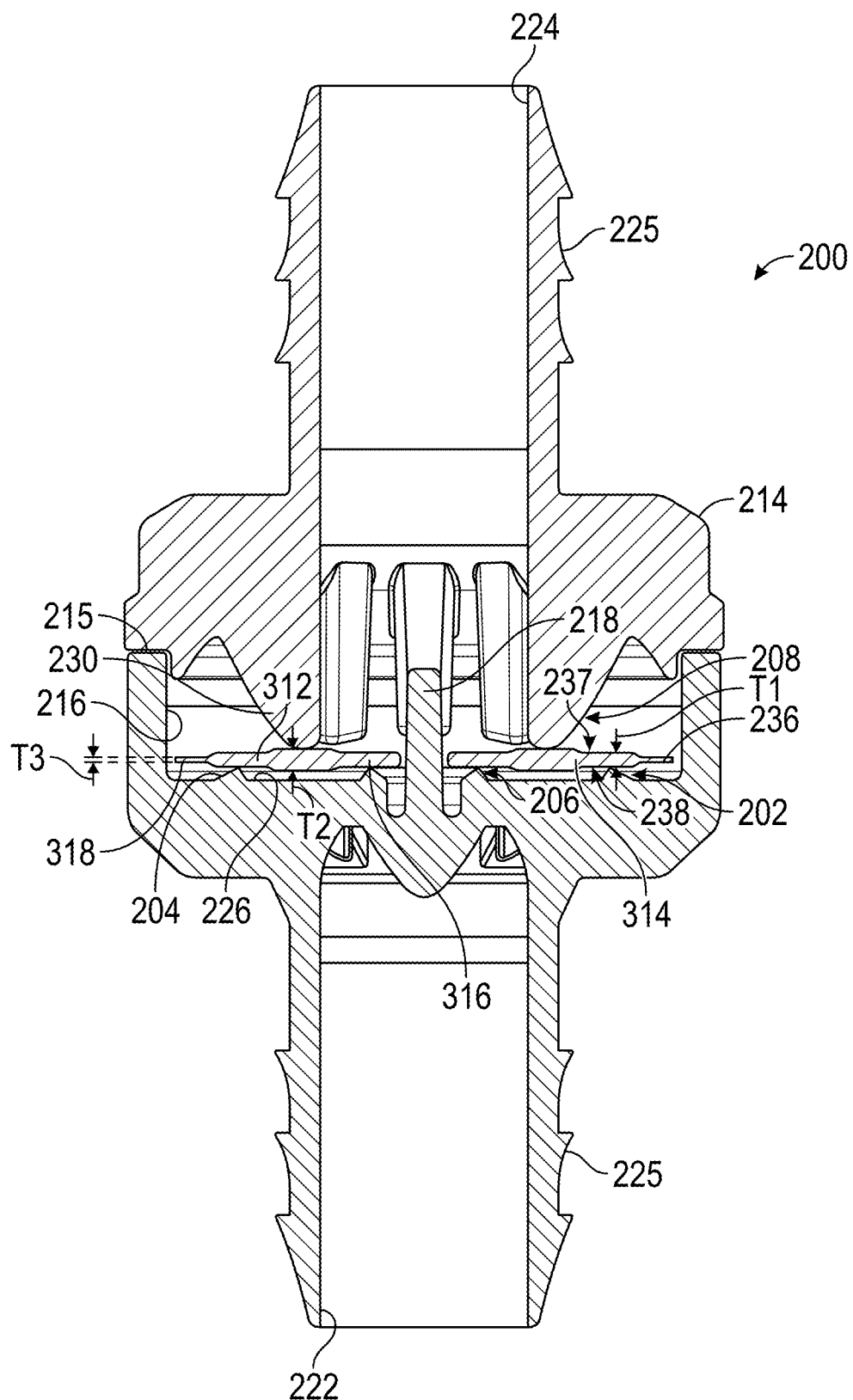
FIG. 4 is a longitudinal cross-section of a normally closed check valve having fingers protruding into the chamber to hold a sealing disk in a closed position.
Figure 5:
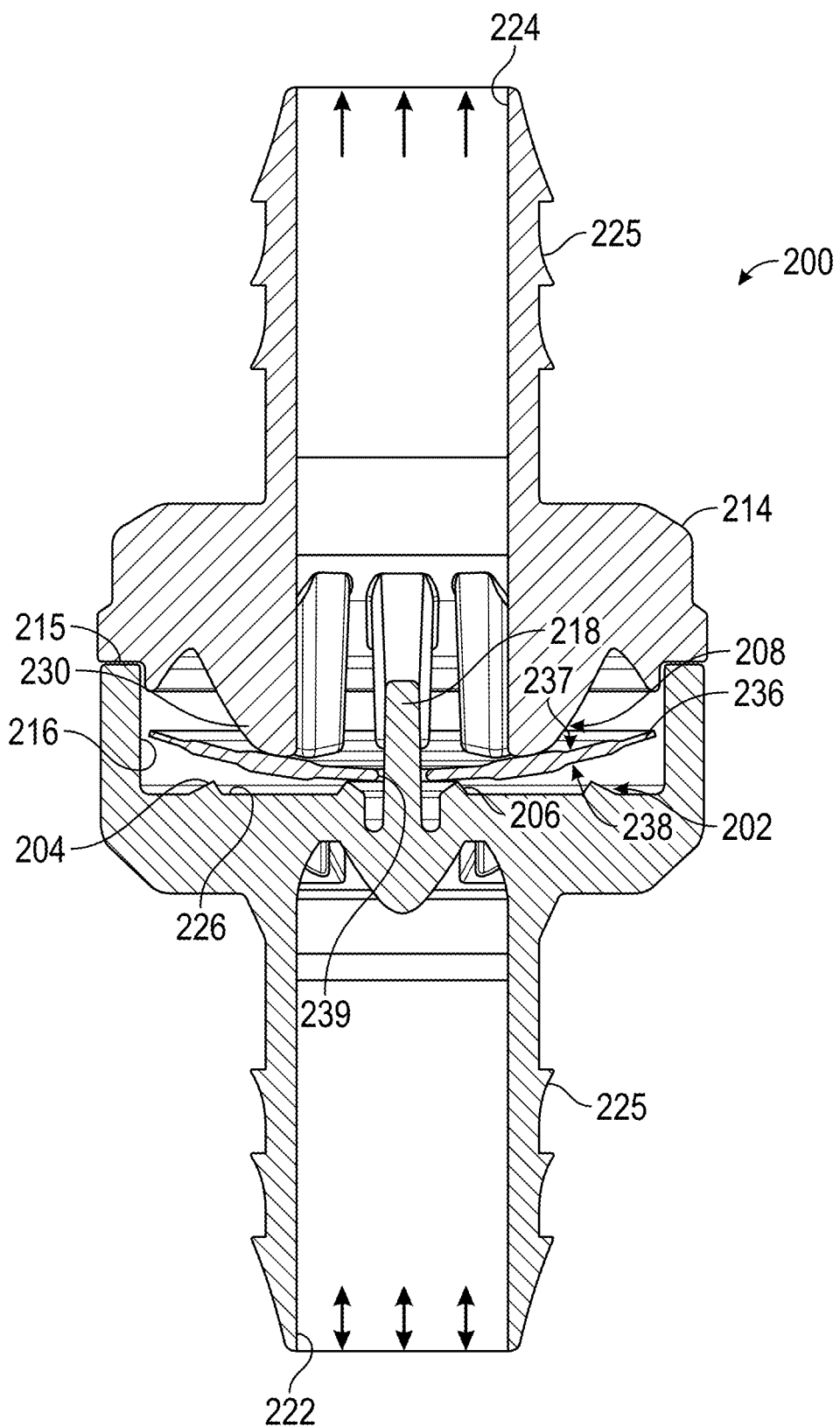
FIG. 5 is a longitudinal cross-section of the normally closed check valve of FIG. 4 with the sealing disk elastically flexed in an open position.

The normally closed check valve 135 of all the embodiments may be a "forced closed" check valve as illustrated in FIGS. 4 and 5, without the presence of a spring. The normally closed check valve 135 defines an internal cavity 216 in which an elastically flexible disk 236 is seated and is held in the closed position of FIG. 5 against a first seat 202 by a plurality of fingers 230 extending into the internal cavity, wherein a pressure drop across the elastically flexible disk 236 from the first seat 202 to the plurality of fingers 230 flexes the elastically flexible disk into an open position shown in FIG. 5.

Figure 6:
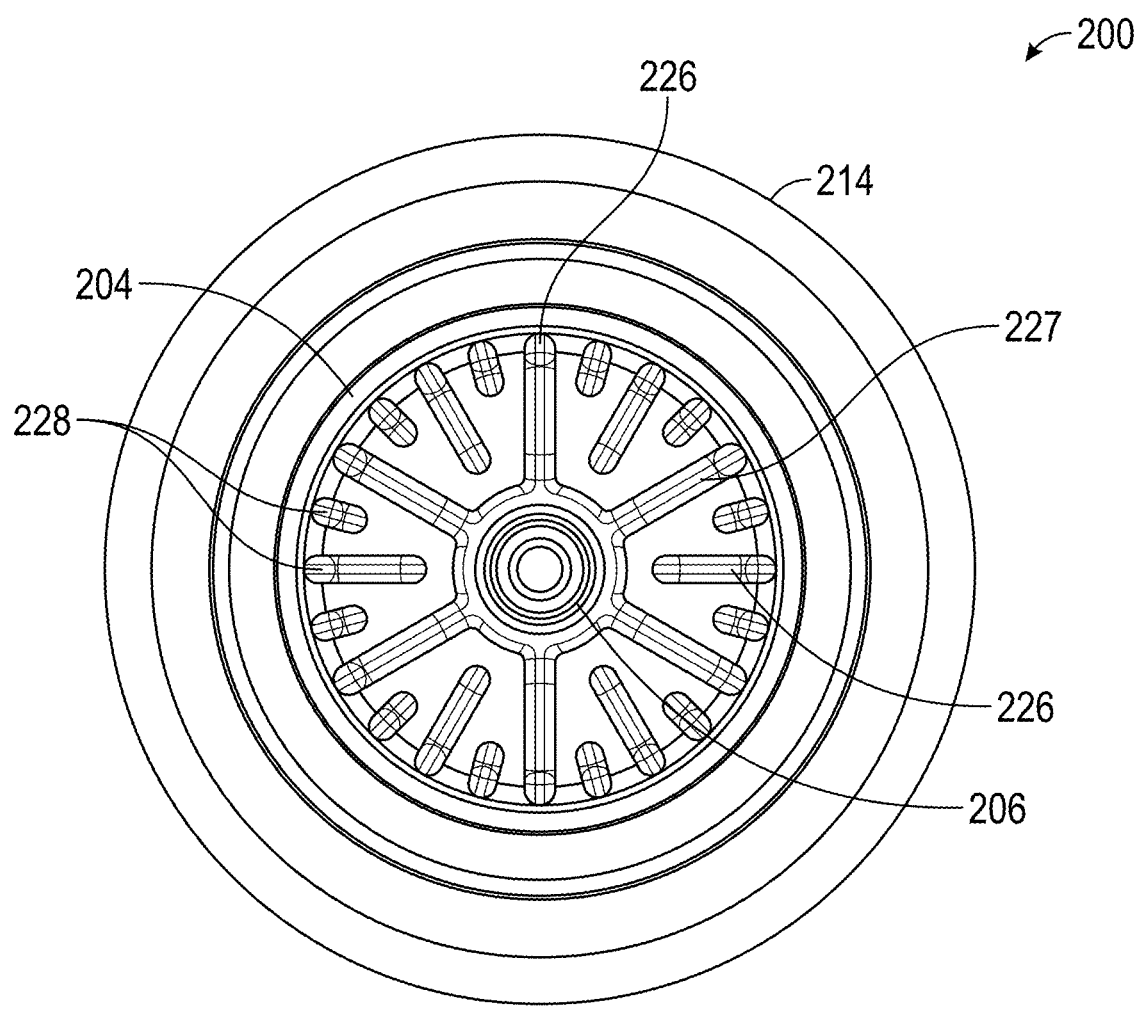
FIG. 6 is a top pan view of one embodiment of the portion of the check valve defining the first seat for the sealing disk.

The check valve 200 includes a housing 214 defining an internal cavity 216 having a pin 218 therein upon which is seated a sealing disk 236. The housing 214 defines a first port 222 in fluid communication with the internal cavity 216 and a second port 224 in fluid communication with the internal cavity 216. The housing 214 may be a multiple piece housing with pieces connected together with a fluid-tight seal 215. The internal cavity 216 typically has larger dimensions than the first port 222 and the second port 224. The pin 218 is centrally positioned within the internal cavity 216 and a plurality of ribs 226 comprising connecting ribs 227 and/or partial ribs 228, as shown in FIG. 6, in any of the configurations disclosed in U.S. Pat. No. 10,107,240 extend radially outward from the pin 218 or toward the pin 218 to subdivide the flow path leading into the internal cavity 216 into a plurality of conduits to direct the fluid flow around the periphery of the sealing disk 236 when the check valve 200 is elastically flexed into the open position shown in FIG. 5.

The plurality of ribs 226 may be all connecting ribs 227 or may include both connecting ribs 227 and one or more partial ribs 228 between neighboring connecting ribs. When the plurality of ribs 226 are all connecting ribs 227 there are typically five or six thereof, but is not limited thereto. FIG. 6 is an example of a six connecting ribs 227 configuration with partial ribs 228. The partial ribs may have the same length, axially, or the partial ribs may have different lengths as shown in FIG. 6, which has a 6×3 rib configuration. The description of the rib configuration as a number by a number represents the number of connecting ribs by the number of partial ribs in between neighboring connecting ribs. Other example embodiments may have a 6×2 rib configuration, a 6×1 rib configuration, or a 5×1 rib configuration, and many other variations.

In the illustrated embodiment, the first port 222 and the second port 224 are positioned opposite one another, but is not limited to this configuration. In another embodiment, the first and second ports may be positioned relative to one another at an angle of less than 180 degrees. The portion of the housing 214 defining the internal cavity 216 includes an internal first seat 202, here collectively a first annular seal bead 204 and a second annular seal bead 206, upon which the sealing disk 236 seats when the check valve is "closed." The second annular seal bead 206 is radially inward of the first annular seal bead 204. A second seat 208 is defined by a plurality of radially spaced fingers 230 extending into the internal cavity 216 from an interior surface of the internal cavity 216 that is more proximate the second port 224. The plurality of radially spaced apart fingers 230 have a preselected length that places the plurality of radially spaced apart fingers 230 in direct contact with the sealing disk 230 while the sealing disk 236 is seated against the first seat 202, thereby holding or forcing the sealing disk 236 in the closed position shown in FIG. 4.

The first port 222 and the second port 224 may each define or include an elongate connector extending away from the internal cavity 216 having a connector feature 225 on the outer surface thereof or at the end thereof for connecting the internal passageway for fluid communication within the crankcase ventilation breach detection system of any of FIGS. 1-3.

The sealing disk 236 illustrated in FIGS. 4 and 5 is a stepped disk as described in co-owned U.S. Pat. No. 10,107,240, but is not necessarily limited thereto. The disk 236 could be a flat planar disk. A stepped disk is one having a shape and configuration relative to the first seat 202 and its first annular seal bead 204, its second annular seal bead 206, and its ribs 226. The sealing disk 236 has a stepped longitudinal cross-section profile, from the outer diameter inward toward the inner diameter there are in order, two mirror image upward steps and then one mirror image downward step on the opposing upper and lower faces 237, 238 of the disk. Described another way, with reference to FIG. 4, the sealing disk 236 has a first sealing portion 312 seatable against the first annular seal bead 204 and a second sealing portion 316 seatable against the second annular seal bead 206. The first sealing portion 312 and the second sealing portion 316 each have a first thickness $T_1$ (i.e., generally the same thickness). The sealing disk 236 has an intermediate portion 314 between the first sealing portion 312 and the second sealing portion 316 that has a second thickness $T_2$ that is greater than the first thickness $T_1$, and has a lip portion 318 defining the outer periphery of the seal disk 236 and having a third thickness $T_3$ that is less than the first thickness $T_1$. $T_2$ is about 10% to about 80% greater than $T_1$, and more preferably about 30% to about 60% greater than $T_1$. The thickness $T_3$ of the lip portion 318 is about 20% to about 80% less than $T_1$, and more preferably about 30% to about 50% less than $T_1$. The sealing disk 236 is held against the first seat 202 by the fingers 230 in the closed position and is elastically flexible to bend toward the second seat 208 in response to a preselected pressure drop across the check valve 200. The sealing disc 236 transforms between a flat shape in the closed position to a shallow bowl shape in the open position and back again. The sealing disc 236 readily flexes when there is a pressure drop from the side of the first seat 202 to the second seat 208, i.e., the first port 222 to the second port 224.

The sealing disk 236 has a central bore 239 (labeled in FIG. 5) therethrough that receives the pin 218. The pin 218 acts as an alignment member to hold the sealing disk 236 in its operating position, such that the elastic flexing of the disk does not cause the disk to travel within the chamber 216. The sealing disk 236 may be or includes an elastomeric material suitable for use in fluid communication with blow-by-gas from the crankcase ventilation system of an internal combustion engine, i.e., is durable when exposed to temperatures and pressures associated with such an environment. In one embodiment, the sealing disk 236 may be or include one or more of a natural rubber, synthetic rubber, silicone rubber, fluorosilicone rubber, fluorocarbon rubber, nitrile rubber, EPDM, PTFE, and combinations thereof, but is not limited thereto.

Figure 7:
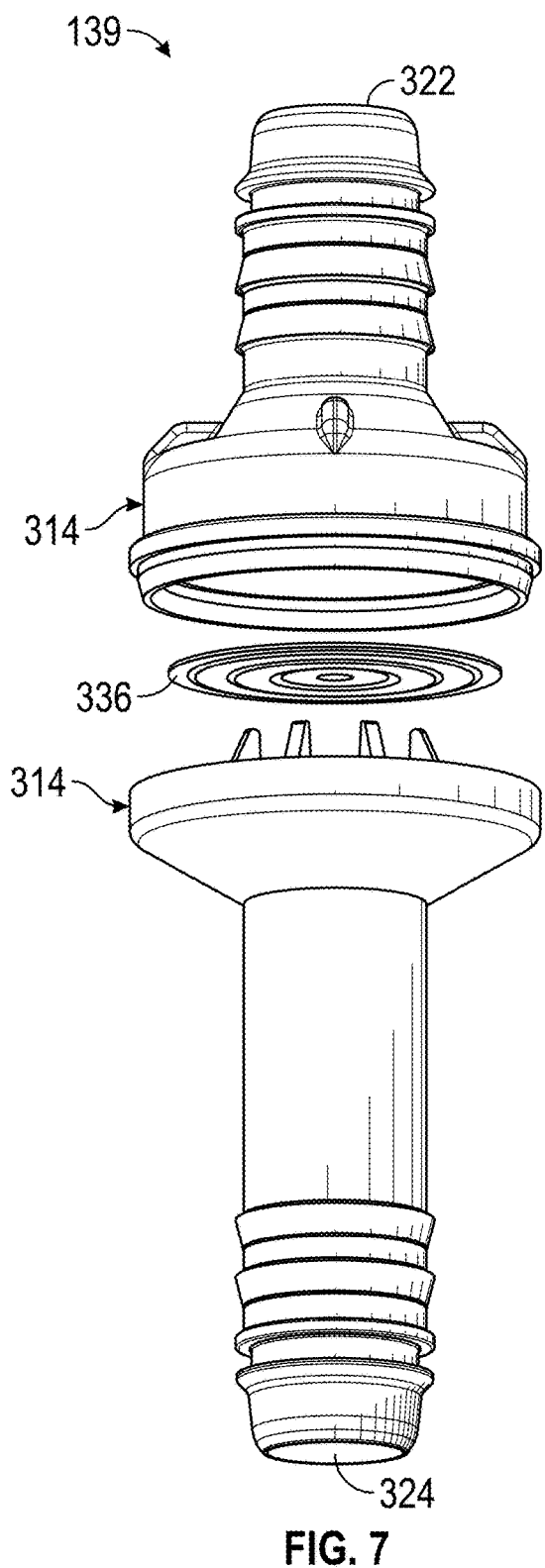
FIG. 7 is a check valve having a stepped disk that floats therein.
Figure 8:
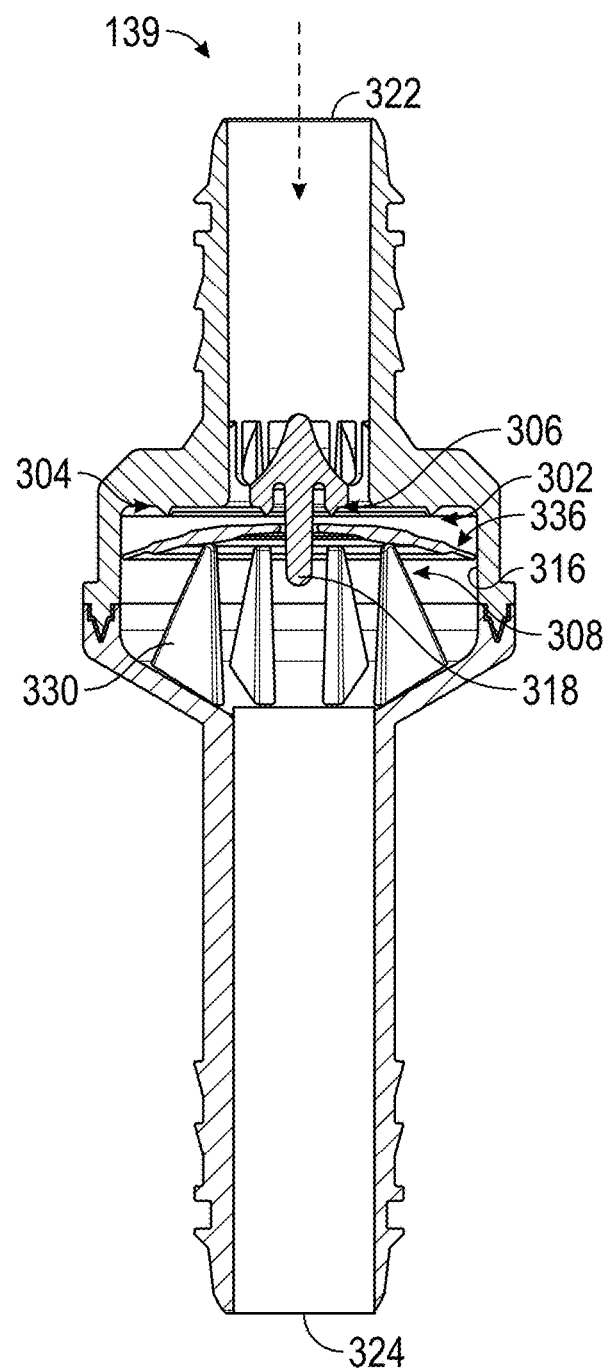
FIG. 8 is a longitudinal, cross-sectional view of the check valve of FIG. 7.

Referring now to FIGS. 7 and 8, the second check valve 139, which is a normally neutral check valve, defines an internal cavity 316 in which a sealing disk 336 floats and translates between an open position and a closed position based on pressure drops in the system. The check valve 139 has a housing 314 defining an internal cavity 316 having a pin 318 therein upon which is seated a sealing member 336, such as a stepped disk described above, and defining a first port 322 in fluid communication with the internal cavity 316 and a second fluid port 324 in fluid communication with the internal cavity 316. The housing 314 may be a multiple piece housing with pieces connected together with a fluid-tight seal. The internal cavity 316 typically has larger dimensions than the first port 322 and the second port 324. The pin 318 is seen centrally positioned within the internal cavity 316 and a plurality of ribs 226 made up of connecting ribs 227 and/or partial ribs 228 as illustrated in FIG. 6 in any of the configurations noted above extend radially outward from the pin 318 or toward the pin 318 to subdivide the flow path leading into the internal cavity into a plurality of conduits to direct the fluid flow around the periphery of the sealing member 336 when the check valve 139 is in an open position as shown in FIG. 8.

In the illustrated embodiment, the first port 322 and the second port 324 are positioned opposite one another, but is not limited to this configuration. In another embodiment, the first and second ports 322, 324 may be positioned relative to one another at an angle of less than 180. The portion of the housing 314 defining the internal cavity 316 includes an internal first seat 302 (here collectively first seal bead 304 and second seal bead 306) upon which the sealing member 336 seats when the check valve is "closed" and a second seat 308 upon which the sealing member seats when the check valve is "open." Here, the second seat 308 is a plurality of radially spaced fingers 330 extending into the internal cavity 316 from an interior surface of the internal cavity 316 that is more proximate the second port 324.

The first port 322 and the second port 324 may each include a portion of a conduit extending therefrom that may include a connector feature on the outer surface thereof or at the end thereof for connecting the internal passageway defined by the conduit for fluid communication within a system.

Turning now to FIGS. 10-15, an alternate embodiment for the normally closed check valve 135 is disclosed. The check valve 400 has a housing 402 having a first housing portion 404 defining a first port 405 and a second housing portion 406 defining a second port 407 that are sealingly fixed together with a fluid-tight seal at flange 408 and collectively define an internal cavity 410. The first port 405 and the second port 407 are both in fluid communication with the internal cavity 410. The internal cavity 410 typically has larger dimensions than the first port 405 and the second port 407. In the illustrated embodiment, the first port 405 and the second port 407 are positioned opposite one another to define a generally linear flow path through the check valve 400, when the hemispherical poppet sealing member 414 is not present, but is not limited to this configuration. In another embodiment, the first and second ports may be positioned relative to one another at an angle of less than 180 degrees.

Figure 11:
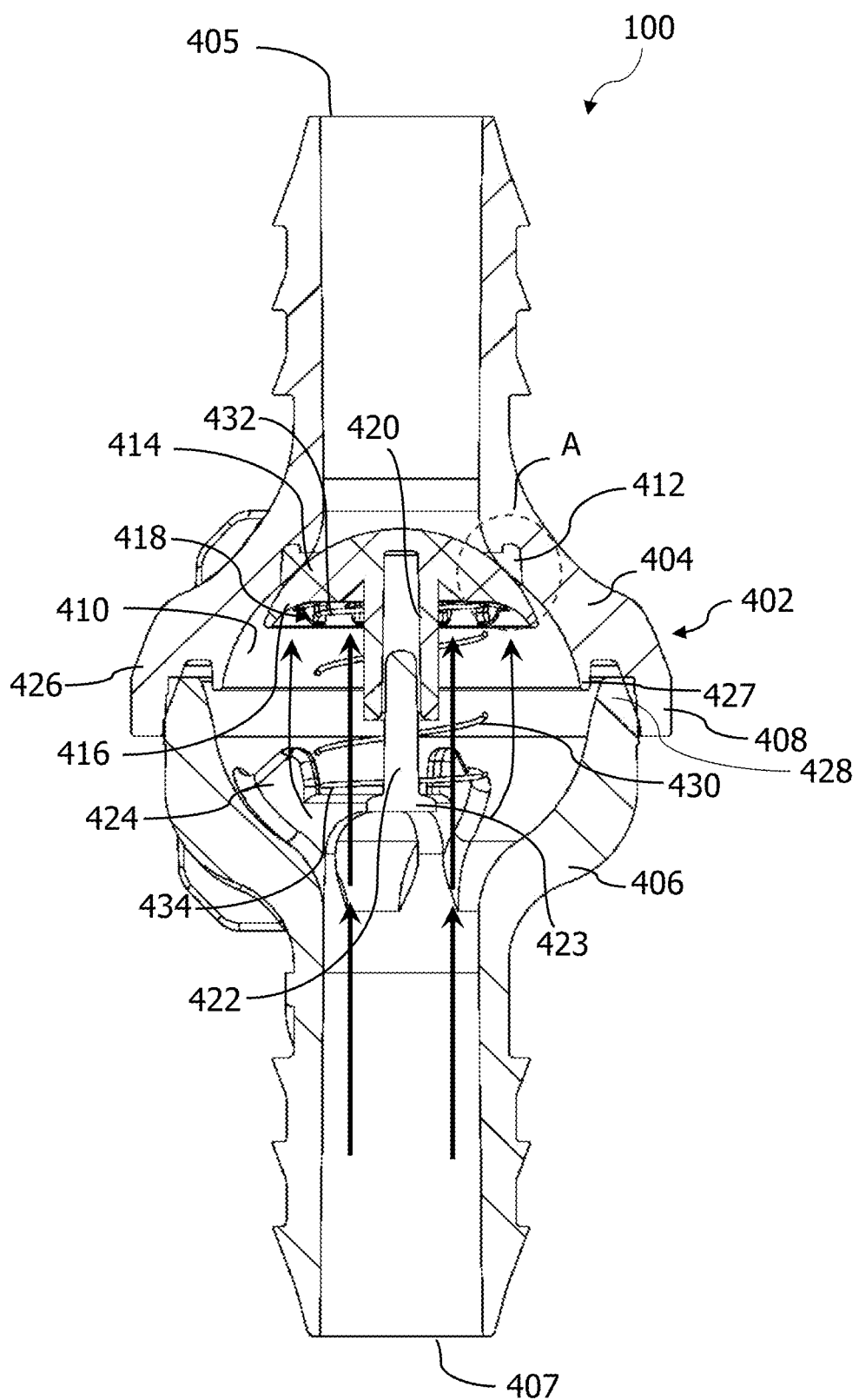
FIG. 11 is a longitudinal, cross-sectional view of one embodiment of the check in the closed position.
Figure 12:
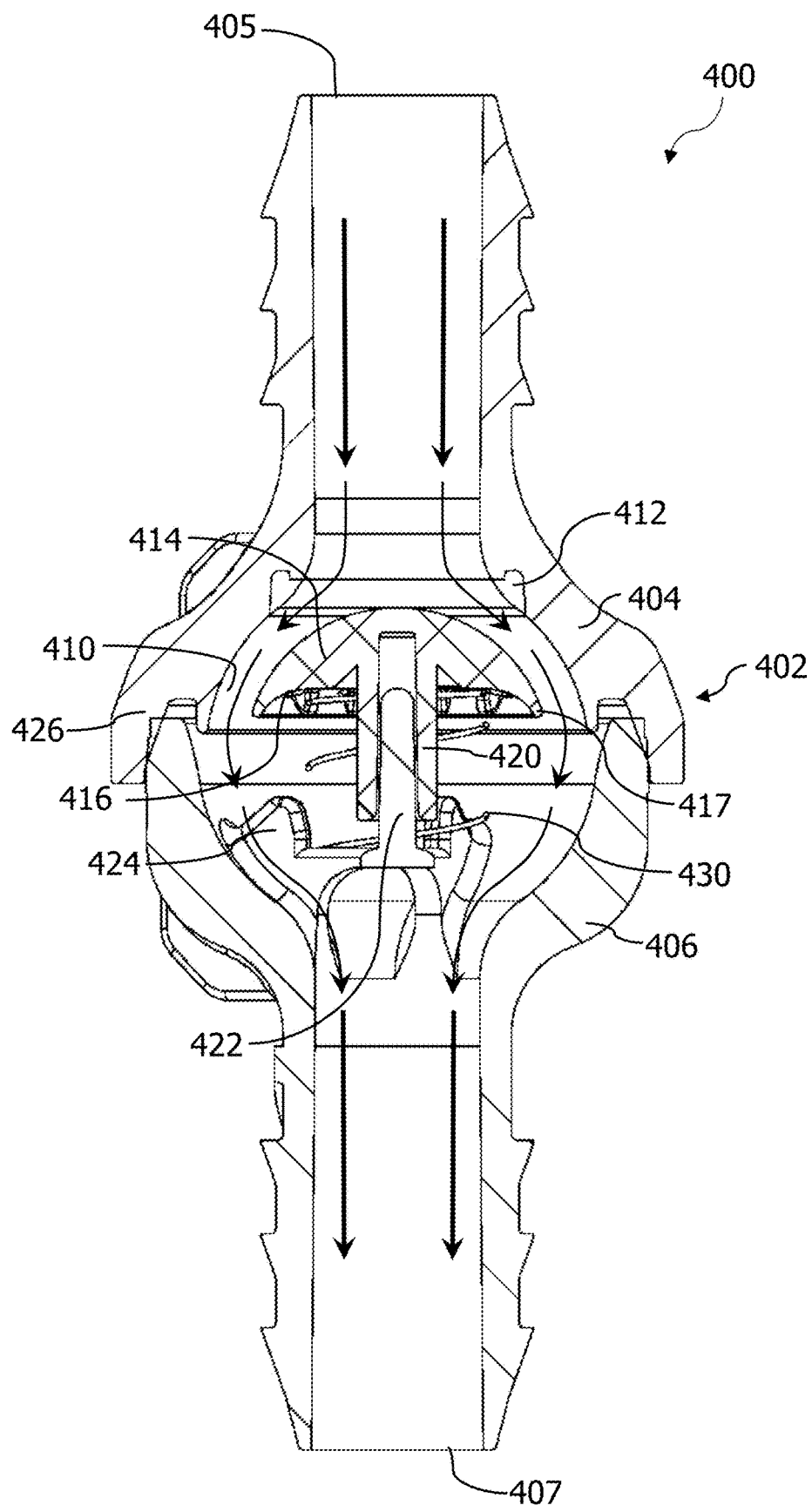
FIG. 12 is a longitudinal, cross-sectional view of the check valve of FIG. 11 in the open position.

The internal cavity 410 is generally spherically shaped and defines an annular seat 412 for engagement with a hemispherical poppet sealing member 414, which is translatable between a closed position against the annular seat 412 (FIG. 11) and an open position (FIG. 12). The generally spherical shape of the internal cavity 410 complements the shape of the hemispherical poppet sealing member 414 and provides a low restriction flow path in the open position. The annular seat 412 in a longitudinal cross-section through the check valve 400, as shown in FIGS. 11 and 12, defines a convex spherical radius as indicated by arrow 413 in FIG. 13. The convex spherical radius of the annular seat is preferably positioned or formed at a transition from the first port 405 into the internal cavity 410. The internal cavity 410 has a generally spherical shape and, in the closed position, a convex surface of the hemispherical poppet sealing member 414 as indicated by arrow 415 in FIG. 13 is engaged with the convex spherical radius 413 of the annular seat 412.

Figure 13:
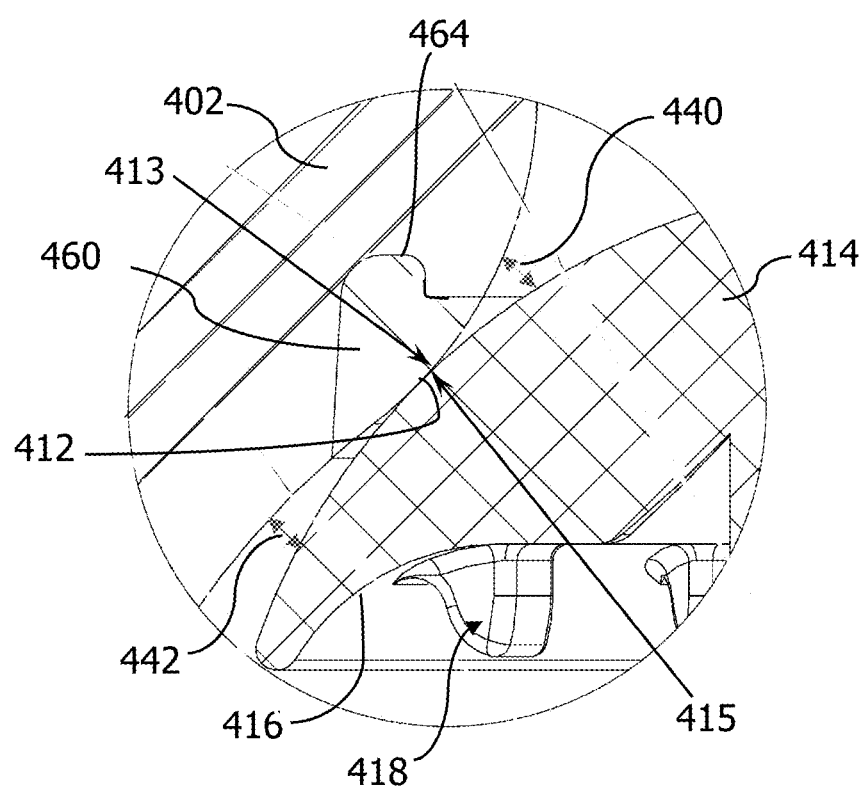
FIG. 13 is an enlarged view of the seal in the circle A of FIG. 11.

Referring to FIG. 13, the convex surface-convex surface seal is shown as an enlarged image. This seal forms a tangent seal interface that is insensitive to slight misalignment of the hemispherical poppet sealing member 414 when closing. A slightly misaligned hemispherical poppet sealing member will still have good seal integrity, approximately 0.5 scc/m or less. As seen, the interior of the housing 402 has, in a longitudinal cross-section, a partial "S" shaped curve centered about the convex spherical radius 413, which defines gaps 440, 442 between the hemispherical poppet sealing member and the housing above and below the convex surface-convex surface seal, based on the orientation of the figure to the page.

Turning back to FIGS. 11 and 12, to aid in seal alignment, the internal cavity 410 has a pin 422 centrally positioned and protruding into the cavity opposite the annual seat 412. The hemispherical poppet valve 414 has a cupped underside 416 defining a first seat 418 for an optional spring 430 and has a hollow stem 420 protruding from the cupped underside 416 toward the pin 422 and receives the pin 422 therein for translation of the hemispherical poppet sealing member 414 along the pin 422. When spring 430 is present, a first end 432 of the spring 430 is seated and retained by first seat 418 in the cupped underside 416 of the hemispherical poppet sealing member 414 and a second end 434 of the spring 430 is seated and retained be a second seat 424 defined by the housing 402 and protruding into the internal cavity proximate a base 423 of the pin 422. The cupped underside 416 of the hemispherical poppet sealing member 414 provides a large restriction to fluid flow in the "non-flow direction" represented by the arrows in FIG. 11, thereby producing sufficient force to translate the sealing member to the closed position, even without the spring force provided by the spring, if desired.

Referring to FIGS. 11-15, in all embodiments, one or both of the annular seat 412 and the hemispherical poppet sealing member 414 include a ring of elastomeric sealing material 460 (FIGS. 11-13) to define the convex spherical radius 413 of the annular seat 412 or to define the portion of the convex surface 462 of the hemispherical poppet sealing member 414 (FIGS. 14 and 15) that engages the annular seat 412 in the closed position. The ring of elastomeric sealing material 460 matches (is flush with) the partial "S" shaped curved contour of the first housing portion 404 so as not to create a flow restriction, in the open position and the ring of elastomeric sealing material 462 matches (is flush with) the hemispherical surface of the hemispherical poppet sealing member 414 so as not to create a flow restriction, in the open position. The ring of elastomeric sealing material 460, 462 is insert molded or co-molded as part of one or both of the annular seat 412, i.e., first housing portion 404, and the hemispherical poppet sealing member 414. Either or both of the rings of elastomeric sealing material 460, 462 may include an annular lip 464 best seen in FIG. 13 to help retain the molded elastomeric sealing material 460, 462 in place in its respective member.

The ring of elastomeric sealing material 460, 462 may be formed of a fluoroelastomer. Suitable fluoroelastomers include, but are not limited to, polyvinyl fluoride, polyvinylidene fluorides, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylenetetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, or other commercially available elastomeric material that will provide seal integrity at both low pressure differentials (such as 5 kPa) and at high pressure differentials (such as 200 kPa), and blends thereof. Ethylene propylene diene monomer and derivatives thereof are also suitable for the ring of elastomeric sealing material.

In all embodiments, the hemispherical poppet sealing member 414 has a cupped underside 416 defining an outer rim 417. The poppet can be made of polyoxymethylene, polyamides, polypropylene, polyphenylene ether or polyphenylene oxide, or other commercially available polymers that would meet the temperature and strength requirements of the application.

Figure 14:
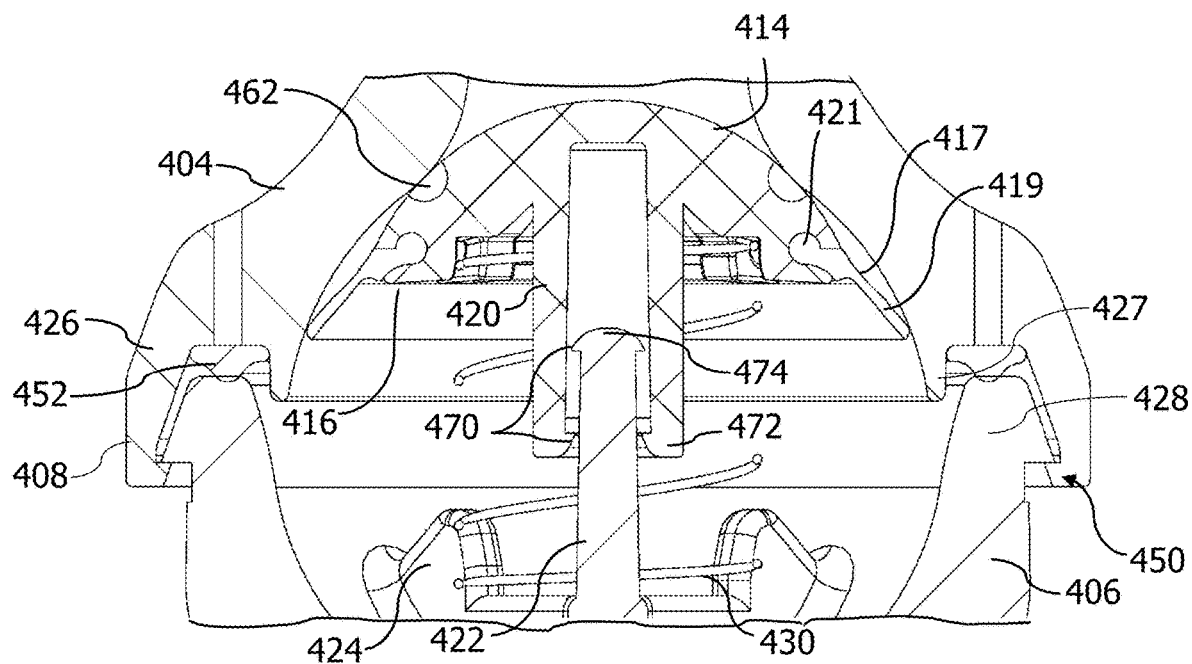
FIG. 14 is longitudinal, cross-sectional view of the check valve chamber of a second embodiment of a check valve.
Figure 15:
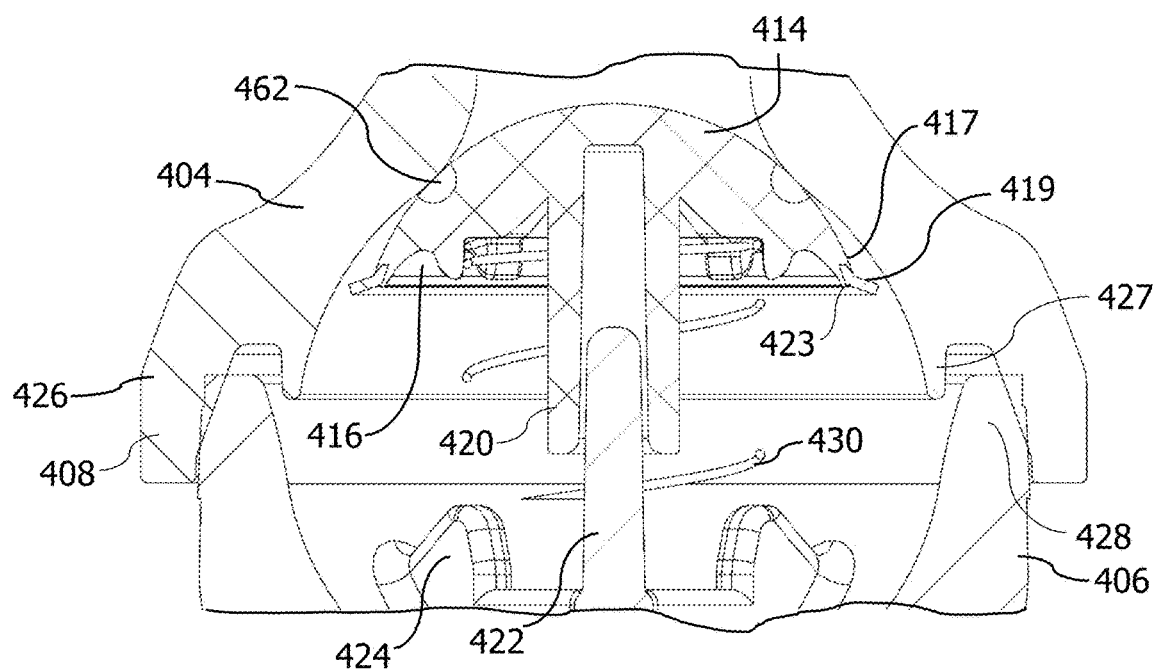
FIG. 15 is longitudinal, cross-sectional view of the check valve chamber of a third embodiment of a check valve.

Referring now to FIGS. 14 and 15, the outer rim 417 can include an elastomeric flange 419 extending radially outward that, in the closed positioned, forms a clearance fit or an interference fit with a surface of the internal cavity 410. This elastomeric flange 419 enhances the ability of the hemispherical poppet sealing member 414 to close under low reverse flow conditions. The elastomeric flange 419 is insert molded or co-molded to the hemispherical poppet sealing member 414 and may include a head 421 inserted into the hemispherical poppet sealing member 414 as shown in FIG. 14. The elastomeric flange 419 as shown in FIG. 15 may include a hinge feature 423 that allows the elastomeric flange 419 to bend out of the way in response to the pressure differentials in the system to maintain minimal restrictions on the fluid flow through the check valve in the open position, i.e., the flange 419 bends away from the surface of the internal cavity 410 toward the stem 420 and the pin 422.

With reference to all the figures, the first housing portion 404 terminates away from the first port 405 with a double flanged end 426, wherein an interior flange 427 of the double flange is shorter than an exterior flange 408 of the double flange and the interior flange 427 is contoured to lie radially inward of a rim 428 of the second housing portion 406 to collectively define the generally spherical shape of the internal cavity 410. The spherical radius and/or the radial position of spherical radius center of the first housing portion's profile is slightly less than the spherical radius and/or the radial position of spherical radius center of the second housing portion's profile, which creates an "overlap" of the interior flange 427 with the rim 428 described above and provides a low restriction flow path as well as low audible noise in the check valves 400.

The exterior flange 408 of the first housing portion 404 and the rim 428 of the second housing portion 406 can have a snap-fit connection 450 as shown in FIG. 14. In all embodiments, the first housing portion 404 and the second housing portion 406 can be formed of a plastic material suitable for combustion engine environments and can be spin-welded together. As shown in FIG. 14, the double flange end 426 of the first housing portion 404 can include an annular bead of sealing material 452 between the interior flange 427 and the exterior flange 408 to provide additional material for the spin weld.

Referring again to FIG. 14, the open end 472 of the stem 420 and the head 474 of the pin 422 can have snap-fit features 470 to assist in maintaining the position of the hemispherical poppet sealing member 414 during assembly of the check valve 400.

In all aspects, the housing 402 is typically molded of plastic, such as, but not limited to, nylon 6, nylon 4/6, nylon 6/6, polyoxymethylene, and/or other commercially available plastics that will provide fluid tight seal integrity at both low pressure differentials (such as 5 kPa) and at high pressure differentials (such as 200 kPa) and are suitable for engine operating systems that can experience pressures between 101 kPa to −80 kPa and temperatures between −40° C. to 20° C., as well as road and weather conditions and debris.

The check valve 400 has several advantages over other check valves. One advantage is that the check valves open under low differential pressure, such as but not limited to a difference of 5 kPA and has low flow restriction once open. The low flow restriction in the open position is a result of the combined shapes of the generally spherical internal cavity and the upper surface of the hemispherical poppet sealing member (see the flow arrows in FIG. 12), more particularly, the internal flange of the first housing portion overlapping the rim of the second housing portion and defining matching contours once sealingly fixed together. This configuration also provides low audible noise when open and a no-leak seal when closed.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A crankcase ventilation breach detection system of an internal combustion engine comprising:
   an internal combustion engine having a crankcase and an intake manifold;
   a positive crankcase ventilation valve in fluid communication between the crankcase and intake manifold that regulates the flow of blow-by-gas from the crankcase to the intake manifold;
   a crankcase ventilation tube in fluid communication with air from an air intake and the blow-by-gas and subdividing into a flow control system;
   wherein the flow control system comprises:
     a plurality of parallel conduits comprising a first conduit having a normally closed check valve controlling flow through the first conduit, the normally closed check valve opening under a first preselected pressure drop in a first direction of flow from the air intake to the crankcase, and a second conduit having either a second check valve that opens under a second preselected pressure drop in a second direction of flow from the crankcase to the air intake, and a third conduit having a restriction profile having a third preselected pressure drop that is the same in both the first direction and second direction; and
     a pressure sensor positioned between the parallel conduits and the crankcase, wherein detection of no pressure drop by the pressure sensor indicates a breach in the system.

2. The system as claimed in claim 1, wherein the internal combustion engine has a turbocharger and the crankcase ventilation tube connects upstream of the compressor of turbocharger.

3. The system as claimed in claim 2, wherein the second preselected pressure drop is the same or lower than the first preselected pressure drop.

4. The system as claimed in claim 1, wherein the first preselected pressure drop is greater than the third pressure drop, and the second pressure drop is the same or less than the third pressure drop.

5. The system as claimed in claim 1, wherein the normally closed check valve defines an internal cavity in which a hemispherical poppet sealing member is seated and is held in the closed position against an annular seat.

6. The system as claimed in claim 5, wherein the annular seat, in a longitudinal cross-section through the check valve, defines a convex spherical radius and, in the closed position, a convex surface of the hemispherical poppet sealing member is sealing engaged with the convex spherical radius of the annular seat.

7. The system as claimed in claim 6, wherein one or both of the annular seat and the hemispherical poppet sealing member include a ring of elastomeric sealing material to define the convex spherical radius of the annular seat or the portion of the convex surface of the hemispherical poppet sealing member that engages the annular seat in the closed position.

8. The system as claimed in claim 6, wherein the second check valve defines an internal cavity in which a sealing disk floats and translates between an open position and a closed position based on pressure drops in the system.

9. A crankcase ventilation system of an internal combustion engine comprising:
an internal combustion engine having a crankcase and an intake manifold;
a positive crankcase ventilation valve in fluid communication between the crankcase and intake manifold to regulate the flow of blow-by-gas from the crankcase to the intake manifold;
a crankcase ventilation tube in fluid communication with air from an air intake and the blow-by-gas, the crankcase ventilation tube having a first flow direction from the air intake to the crankcase and a second flow direction opposite thereof and subdividing into a flow control system;

wherein the flow control system comprises:
three parallel conduits, a first of the three parallel conduits has a first check valve that opens under a first preselected pressure differential flow in the first direction, a second of the three parallel conduits has a second check valve that opens under a second preselected pressure differential for free flow in the second direction, and a third of the three parallel conduits has a restriction orifice allowing flow in both the first and second direction at pressure differentials below the first preselected pressure differential.

10. The system as claimed in claim 9, wherein the internal combustion engine has a turbocharger and the crankcase ventilation tube connects upstream of the compressor of turbocharger.

11. The system as claimed in claim 1, wherein the first check valve is a normally closed check valve.

12. The system of claim 11, wherein the normally closed check valve an internal cavity in which a hemispherical poppet sealing member is seated and is held in the closed position against an annular seat.

13. The system as claimed in claim 12, wherein the annular seat, in a longitudinal cross-section through the check valve, defines a convex spherical radius and, in the closed position, a convex surface of the hemispherical poppet sealing member is sealing engaged with the convex spherical radius of the annular seat.

14. The system as claimed in claim 13, wherein one or both of the annular seat and the hemispherical poppet sealing member include a ring of elastomeric sealing material to define the convex spherical radius of the annular seat or the portion of the convex surface of the hemispherical poppet sealing member that engages the annular seat in the closed position.

15. The system as claimed in claim 12, wherein the second check valve is a normally neutral check valve and defines an internal cavity in which a sealing disk floats and translates between an open position and a closed position based on pressure drops in the system.

16. The system as claimed in claim 9, wherein the third of the three parallel conduits has a symmetrical restrictor profile such that flow through the restrictor in the first and the second direction occurs under the same pressure differential.

17. The system as claimed in claim 9, wherein the second preselected pressure differential is lower than the first preselected pressure differential.

* * * * *